United States Patent
Wang et al.

(10) Patent No.: US 9,264,379 B2
(45) Date of Patent: Feb. 16, 2016

(54) MINIMUM NETWORK BANDWIDTH IN MULTI-USER SYSTEM

(75) Inventors: Huei Chung Wang, Kirkland, WA (US); Alvin K. Tan, Bothell, WA (US); Amjad Hussain, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 811 days.

(21) Appl. No.: 13/293,035

(22) Filed: Nov. 9, 2011

(65) Prior Publication Data
US 2013/0114624 A1    May 9, 2013

(51) Int. Cl.
  H04L 12/28    (2006.01)
  H04L 12/927    (2013.01)
  H04J 3/16    (2006.01)
  H04L 29/08    (2006.01)
  H04L 1/16    (2006.01)

(52) U.S. Cl.
  CPC ............. *H04L 47/805* (2013.01); *H04J 3/1682* (2013.01); *H04L 67/14* (2013.01); *H04L 67/22* (2013.01)

(58) Field of Classification Search
  USPC .......................................... 370/252, 230, 462
  See application file for complete search history.

(56) References Cited

U.S. PATENT DOCUMENTS

| | | | |
|---|---|---|---|
| 5,841,980 A | 11/1998 | Waters et al. | |
| 7,453,804 B1 * | 11/2008 | Feroz | H04L 12/5693 370/229 |
| 2002/0114334 A1 | 8/2002 | Yang | |
| 2004/0033806 A1 * | 2/2004 | Daniel et al. | 455/450 |
| 2008/0259852 A1 * | 10/2008 | Massiera et al. | 370/329 |
| 2011/0182180 A1 | 7/2011 | Riddle | |
| 2012/0230195 A1 * | 9/2012 | Khivesara et al. | 370/235 |
| 2013/0086235 A1 * | 4/2013 | Ferris | G06F 9/505 709/223 |

OTHER PUBLICATIONS

Su, et al., "Efficient Bandwidth Resource Allocation for Low-Delay Multiuser Video Streaming", In Proceedings of IEEE Transactions on Circuits and Systems for Video Technology, vol. 15, Issue 9, Sep. 2005, pp. 1124-1137.
Dietz, Jack, "An Adaptive Internet Bandwidth Management Architecture", Published on: 1997, Available at: http://citeseerx.ist.psu.edu/viewdoc/download?doi=10.1.1.76.9141&rep=rep1&type=pdf.
Venkatasubramanian, et al., "A Quality of Service Architecture for Resource Provisioning and Rate Control in Mobile Ad Hoc Networks", In International Journal of Ad hoc, Sensor & Ubiquitous Computing, vol. 1, Issue 3, Sep. 2010, pp. 106-120.
Loo, et al., "Declarative Routing: Extensible Routing with Declarative Queries", In Proceedings of Conference on Applications, Technologies, Architectures, and Protocols for Computer Communications, Aug. 21-26, 2005, 14 pages.

* cited by examiner

*Primary Examiner* — John Pezzlo
(74) *Attorney, Agent, or Firm* — Kate Drakos; Harri Valio; Micky Minhas (57) ABSTRACT

The management of bandwidth utilization in a network system that has multiple users. The system identifies the current set of users that are accessing the network by tracking which users are newly accessing the network, which users have ceased accessing the network, and which users continue to access the network over a period of time. The system then guarantees that these identified users will have a certain minimum bandwidth over the period of time. The system then enforces the guaranteed minimum bandwidth for each of the users so that they have no less than the corresponding guaranteed minimum bandwidth. Thus, even if the network bandwidth utilization would be saturated if all requests were satisfied, the system may continue operating while provided some guaranteed level of bandwidth to each user.

23 Claims, 5 Drawing Sheets

MINIMUM NETWORK BANDWIDTH IN MULTI-USER SYSTEM

BACKGROUND

While computing systems used to be solely stand-alone computing systems, modern computing network have enabled for resources to be shared. For instance, corporate networks are now conventionally structured to allow network resources, such as network bandwidth, to be shared amongst multiple users. This removes the requirement that each client computer have its own individually provisioned network access associated with the client.

Thus, as a client makes a request that requires use of the network, the system processes the request and permits the required access. Of course, the amount of network bandwidth is finite, although newer technologies for communication often permit larger and larger network bandwidths to become available at lower and lower costs.

BRIEF SUMMARY

At least one embodiment described herein relates to the management of bandwidth utilization in a network system that has multiple users. The system identifies the current set of users that are accessing the network by tracking which users are newly accessing the network, which users have ceased accessing the network, and which users continue to access the network over a period of time. The system then guarantees that these identified users will have a certain minimum bandwidth over the period of time. The system then enforces the guaranteed minimum bandwidth for each of the users so that they have no less than the corresponding guaranteed minimum bandwidth. Thus, even if the network bandwidth utilization would be saturated if all requests were satisfied, the system may continue operating while provided some guaranteed level of bandwidth to each user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, the management of bandwidth utilization in a network system that has multiple users is described. The system identifies the current set of users that are accessing the network by tracking which users are newly accessing the network, which users have ceased accessing the network, and which users continue to access the network over a period of time. The system then guarantees that these identified users will have a certain minimum bandwidth over the period of time. The system then enforces the guaranteed minimum bandwidth for each of the users so that they have no less than the corresponding guaranteed minimum bandwidth. Thus, even if the network bandwidth utilization would be saturated if all requests were satisfied, the system may continue operating while provided some guaranteed level of bandwidth to each user. After describing a general computing system that may be used to implement aspects of the principles described herein, more regarding the management of bandwidth utilization will be described with respect to FIGS. 2 through FIG. 5.

Figure 1:
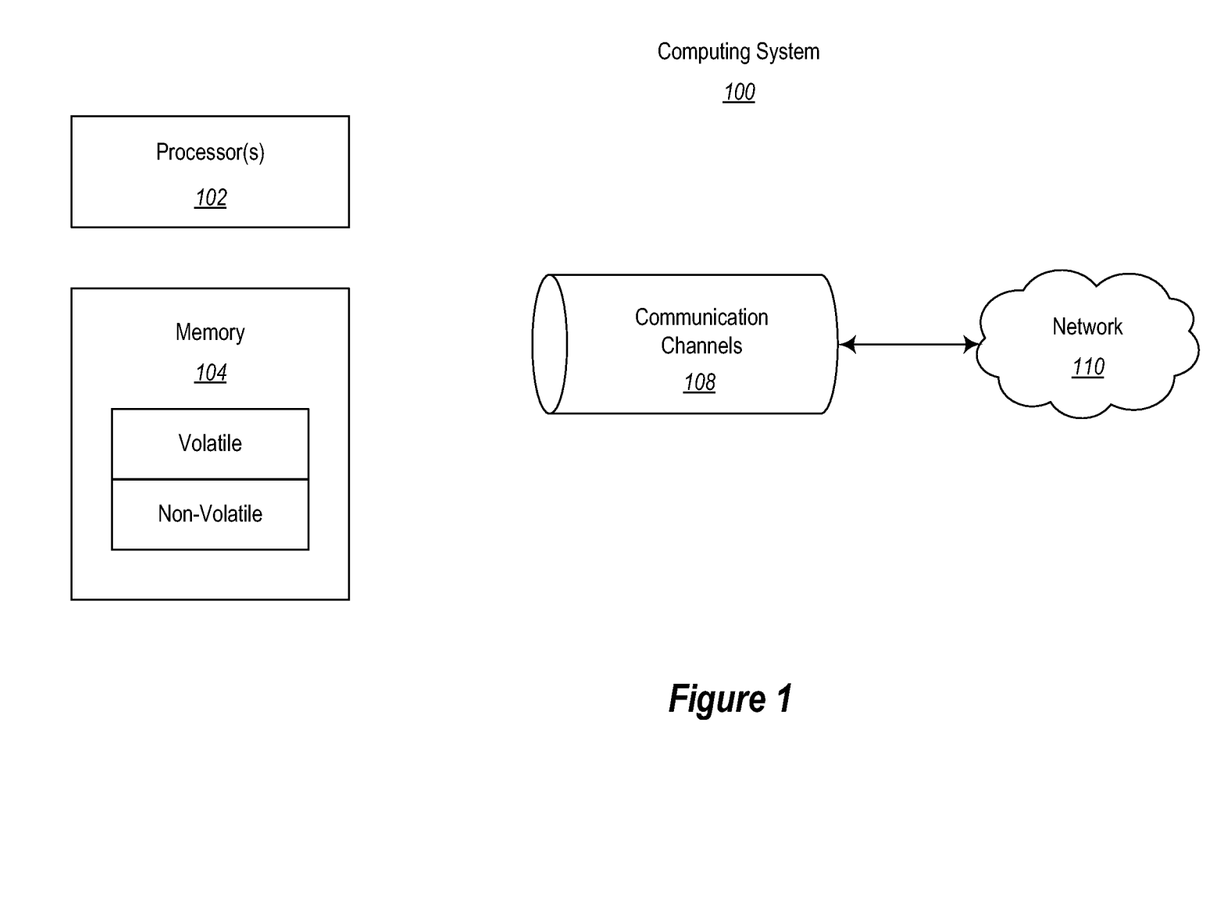
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer. In this description and in the claims, a "computer program product" includes one or more computer storage media having computer-executable instructions thereon that, when executed by the one or more processors of the computing system, perform the function of the computer program product.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
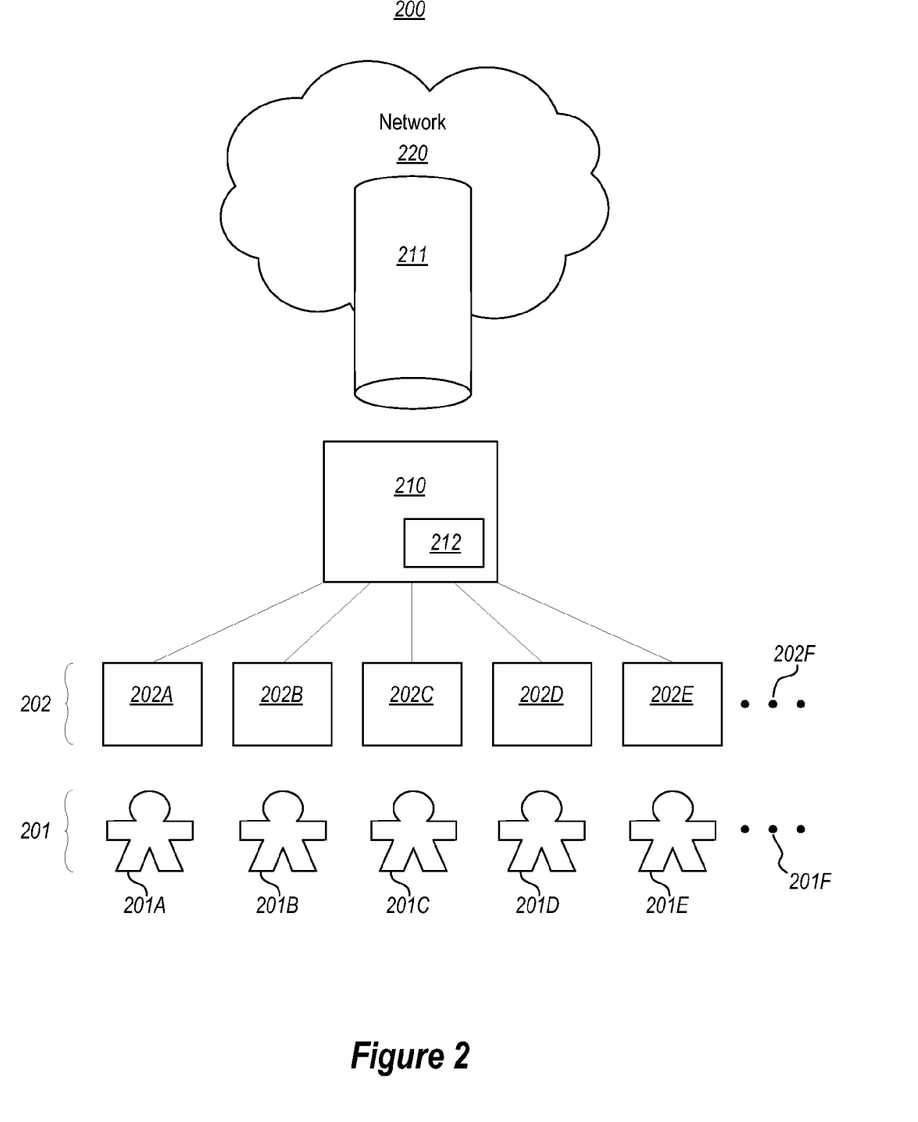
FIG. 2 illustrates an example multi-user system that may be used to employ embodiments described herein.

FIG. 2 illustrates an example multi-user environment (or "system") 200 that may be used to employ embodiments described herein. The environment 200 includes a multi-user network system 210 that communicates with the network 220 through a limited network bandwidth 211. The network 220 may be any network that includes multiple computing systems. For instance, the network 220 may be as large as the Internet, or may be a small network such as a Local Area Network (LAN) or a corporate network, or may be any other type of network as well. Regardless, the network 220 has a finite amount of available bandwidth as represented by bandwidth 211.

The multi-user network system 210 involves multiple users 201. As illustrated in FIG. 2, the multiple users 201 are shown as including five users 201A, 201B, 201C, 201D and 201E. However, the ellipses 201F symbolize that the principles described herein may apply to any environment in which there are multiple users accessing a shared but limited network bandwidth 211. As an example, there may be as few as two such users, but there might also be as many as thousands, or perhaps more users in such an environment. Accordingly, FIG. 2 should only be interpreted as an example environment only.

Each user 201 uses a corresponding client 202. For instance, users 201A through 201E use corresponding clients 202A through 202E. Again, the ellipses 202F represent that there may be any number of such clients since there may be any number of such users. Furthermore, although there is illustrated a one-to-one correspondence between users and clients, the principles described herein are not limited to that correspondence. For instance, there may be multiple users that use a single client and/or there may be a single user that uses multiple clients.

Each client 202 is connected to the multi-user network system 210. The users 201 access the network 220 through the multi-user network system 210 and the communication there between is conveyed essentially through the limited network bandwidth 211. The multi-user network system 210 performs a method for managing bandwidth utilization for each of the plurality of users 201.

As an example, the multi-user network system 210 may perform the acts attributed to the multi-user network system 210 hereinafter by using hardware, software, or a combination of hardware and software. In the case of software, the multi-user network system 210 may be an example of the computing system 100 of FIG. 1. In that case, the multi-user network system 210 might perform the method in response to the processor(s) 102 executing computer-executable instruction that were on one or more computer-readable media (e.g., memory 104) that form part of a computer program product.

Figure 3:
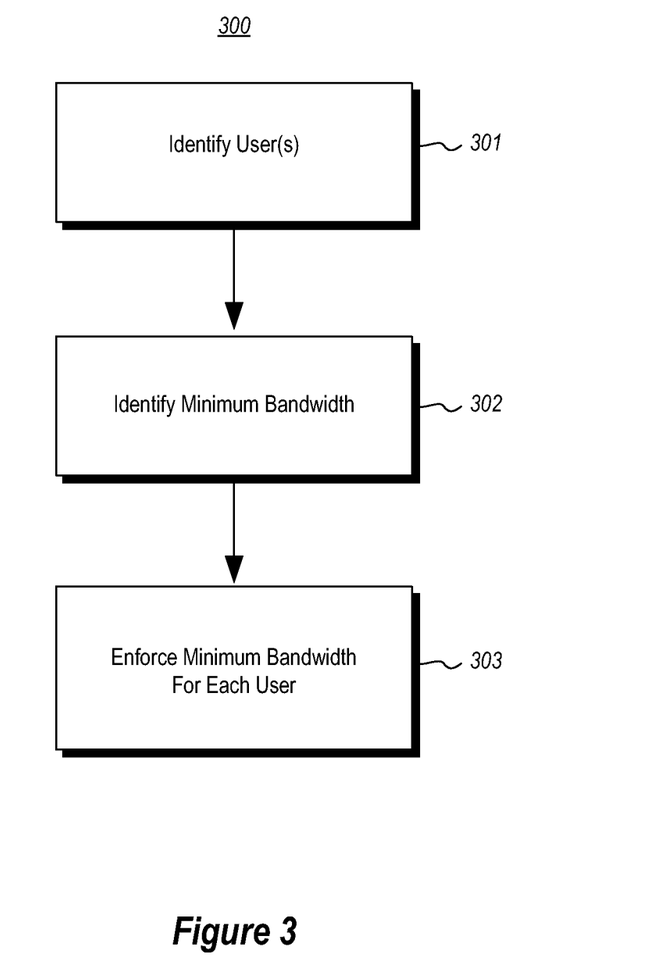
FIG. 3 illustrates an example method for managing bandwidth utilization that may be used to employ embodiments described herein.

The multi-user network system 210 has a system process(es) 212 running. The system process(es) 212 may or may not be generated by a specific user. The general purpose of the system process 212 is for the management of the system as a whole, such as downloading patches for the system 210 or examining the health of the system 210. FIG. 3 illustrates a flowchart of a method 300 for managing bandwidth utilization for each of multiple users. The method 300 may perhaps be performed each time there is a change in the identity of the users, although that is not required. Alternatively or in addition, the method may be performed periodically, and/or in response to some other event. As the method 300 may be performed by the multi-user network system 210 of FIG. 2 in the environment 200 of FIG. 2, the method 300 will now be described with frequent reference to the environment 200 of FIG. 2.

The example method 300 comprises identifying the users (act 301) that are accessing the network by tracking which users are currently using the network. For instance, as users newly access the network, the system 210 registers those new users as being current users. In some embodiments, this might occur when the user issues a login request from the associated client to the system 210. Also, the system might track when users cease using the network, in which case the user is dropped from the list of current users. In some embodiments, this might occur when the users issues a logout request, or perhaps when the client has simply lost contact with the user for a particular period of time or can no longer detect a connect to the corresponding client. In this way, the system 210 tracks the user as they newly access the network, as they cease accessing the network, and as they continue to access the network over a period of time in which the number of identified users changes over time. In some embodiments, the system 210 may track the users in a database as the users change over time.

The method 300 further comprises identifying a guaranteed minimum bandwidth (act 302) for each of the users. For instance, returning to FIG. 2, the system 210 may identify the minimum guaranteed bandwidth for each of the users 201 with respect to the limited network bandwidth 211. Although not required, the corresponding guaranteed minimum bandwidth for at least some of the plurality of users may depend on the number of users over the period of time. As an example, the guaranteed minimum bandwidth for those users may be less if there are more users, and more if there are less users.

That being said, the corresponding guaranteed minimum bandwidth for other users or perhaps all users might not depend on the number of the users over the period of time. As an example, in a mixed scenario, there might be high priority users, who despite the number of users at present, have the same guaranteed minimum bandwidth, while there might be lesser priority users whose guaranteed minimum bandwidth increases when there are lesser users, or decreases when there are more users. However, in some embodiments, all users have a guaranteed minimum bandwidth, which is not dependent on the number of users currently accessing the network 220.

In some embodiments, one or more of the system processes 212 might also be assigned some guaranteed minimum bandwidth, in the case in which the system process is not specific to a particular one of the users, but rather is acting on behalf of the system as a whole.

Figure 4:
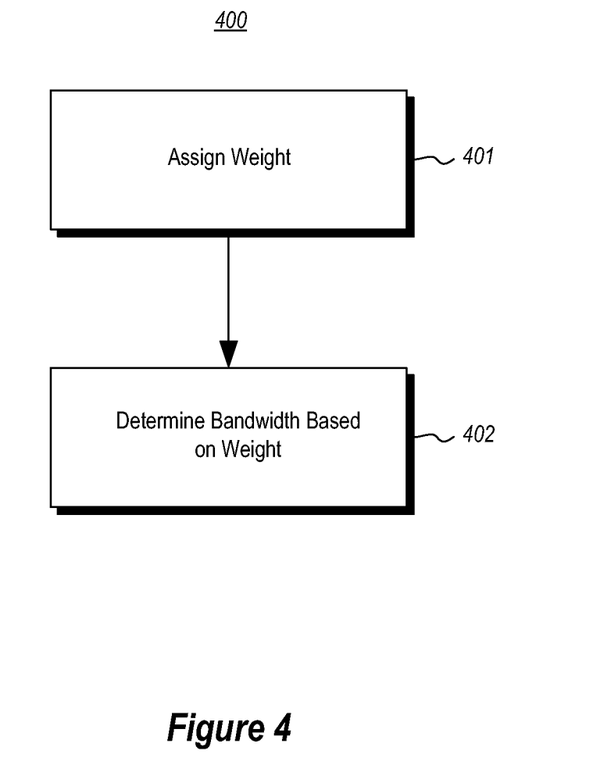
FIG. 4 illustrates an example method for assigning weights to users that may be used to employ embodiments described herein.

FIG. 4 illustrates an example method 400 in which the system (such as system 210 of FIG. 2) may identify the guaranteed minimum bandwidth (reference act 302 of FIG. 3). The method 400 accomplishes this by assigning bandwidth weights to each of the users (act 401); and determining the guaranteed minimum bandwidth for each user based on the bandwidth weights (act 402).

Returning back to FIG. 3, the method 300 comprises allowing (act 303) the users to access to the network such that each of the users has no less than the corresponding guaranteed minimum bandwidth at least during the period of time. For example, with reference to FIG. 2, the system 210 allows the users 201 to access the network 220. As an example, suppose the limited network bandwidth of a certain company is 10 GB/s, and there are 1000 employees. In the case in which each employee has the same amount of guaranteed minimum bandwidth, it might be the policy that each employee of this company be guaranteed 8 MB/s bandwidth.

In some cases, the enforcing of the minimum bandwidth (act 303) may be accomplished by having the system 210 calculates a policy (e.g., network access policy) for each of at least some of the users 201. As an example, this recalculation of policy may be performed each time that a user newly access the network, or each time that a user ceases accessing the network over the period of time. The system may then enforce the recalculated policy such that each of the users has no less than the guaranteed minimum bandwidth.

In order to determine an appropriate guaranteed minimum bandwidth, the system 210 may perform statistical analysis of the network usage. For example, the method 300 might include measuring network usage activity for each of the users that continue to access the network, to determine whether the user has exceeded a guaranteed minimum bandwidth, or to determine whether to adjust the guaranteed minimum bandwidth In addition, the method 300 may be applied when the network bandwidth is overly utilized, but if underutilized, the method might, for example, allow user(s) to obtain unallocated bandwidth when the limited overall bandwidth of the network is not fully allocated.

Figure 5:
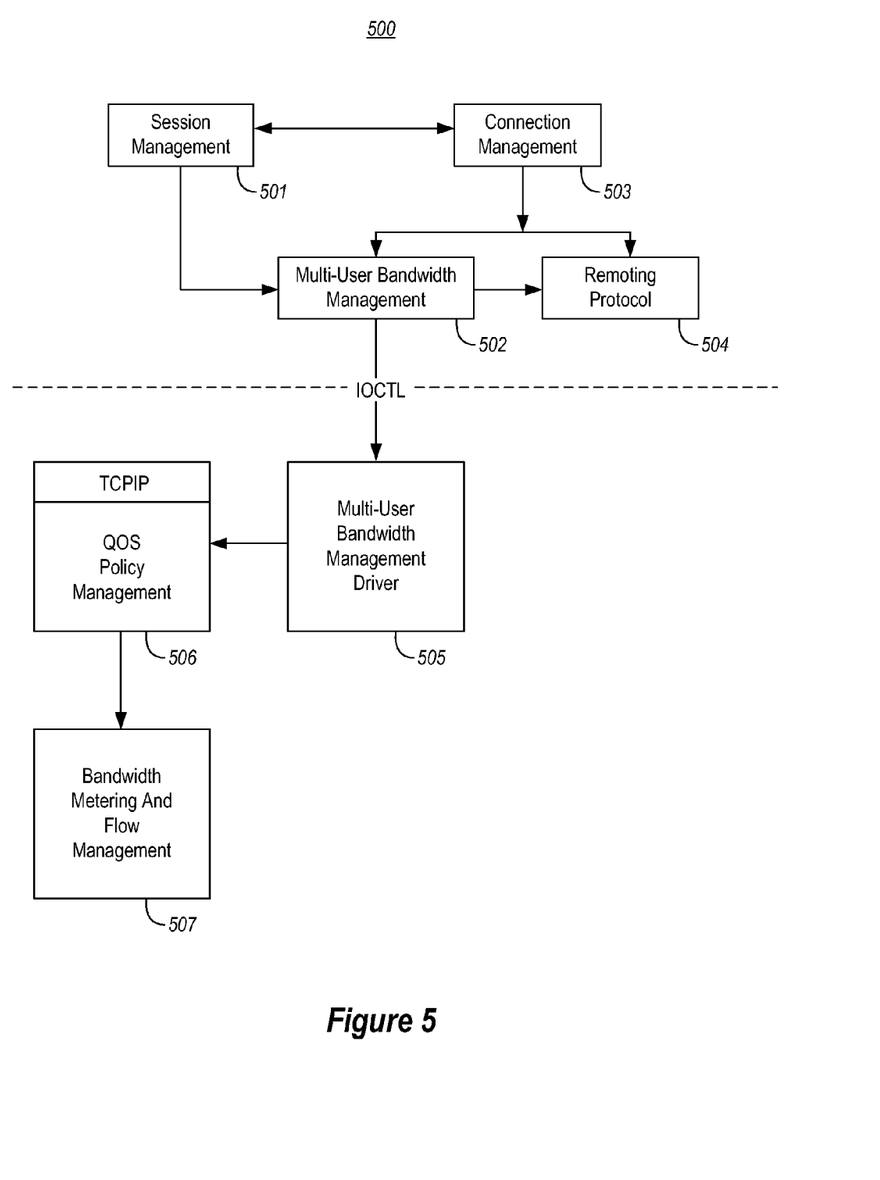
FIG. 5 illustrates an example system structure that may be used to employ embodiments described herein.

FIG. 5 illustrates an example system structure 500 that may be used to employ embodiments described herein. The system structure 505 includes a session management component 501, a connection management component 503, a remoting protocol 504, a multi-user bandwidth management component 502, a multi-user bandwidth management driver 505, a QOS policy management component 506, and a bandwidth metering and flow management component 507. The system structure 500 is just one example of who the multi-user network system 210 may be structured. However, there is an infinite variety of architectures that may be used to implement such a system 210, and as such FIG. 5 is provided only as a very specific example, and should not be used in any manner to unduly limit the claims.

The session management component 501 creates a login environment for each user and submits session notifications to the multi-user bandwidth management component 502.

The connection management component 503 manages the connection with remote servers based on the remoting protocol 504.

The multi-user bandwidth management component 502 receives the session notifications, keeps tracking the change of users (such as 201 of FIG. 2), and submits a user database containing the users currently accessing the network (e.g., network 220).

The multi-user bandwidth management driver 505 receives the user database and calculates policies according to the user database. Specifically, the multi-user bandwidth management driver 505 assigns weights to each of the users and allocates a part of the limited network bandwidth accordingly to each user.

The QOS policy management 506 is responsible for managing the policies defined by the multi-user bandwidth management driver 505, as well as enforcing the traffic classification portion of these policies. As each user generates network traffic, either directly through applications that the user runs, or indirectly through a service, this component is responsible for matching the user's traffic characteristics against the policies defined by the multi-user bandwidth management driver 505. Once the network traffic is matched against a policy, it is assigned a flow. In one embodiment, all network traffic in the system passes the bandwidth metering and flow management component 507 and it is this guarantee that allows this component to monitor the bandwidth used by all users (or all flows) on the system, although this is not required for the broadest aspects described herein. All network traffic that arrives at the bandwidth metering and flow management component 507 is associated with a flow, either directly as matched by the QOS policy management 506 or indirectly by assignment to a default flow. Bandwidth is then divided fairly among all these flows based on the flow weights provided by the multi-user bandwidth management driver 505.

According, mechanism for fairly allocating network bandwidth amongst multiple users in a multi-user network system has been described in a manner that each of the users is guaranteed a particular minimum amount of network bandwidth. In this way, even if the network is on the verge of being overutilitized, the user still feels as though his/her network bandwidth is not being adversely impacted by other users and their choices of network utilization.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method for managing bandwidth utilization in a multi-user network system, the method being implemented by a computing system that includes at least one hardware processor and system memory storing computer-executable instructions which, when executed by the at least one hardware processor, implement the method, the method comprising:
    an act of the computing system tracking a plurality of users to identify which users are newly accessing the network, which users have ceased accessing the network, and which users continue to access the network over a period of time, wherein the plurality of users changes over the period of time;
    an act of the computing system calculating a guaranteed minimum bandwidth for each of the plurality of users if there is a change in the identified plurality of users that are logged into the network; and
    an act of the computing system allowing the identified plurality of users access to the network and enforcing the guaranteed minimum bandwidth for each of the identified plurality of users such that each of the identified plurality of users has no less than the corresponding guaranteed minimum bandwidth at least during the period of time.

2. The method as recited in claim 1, wherein the act of identifying the plurality of users comprises an act of creating a user database for dynamically tracking the users that are accessing the network.

3. The method as recited in claim 1, further comprising an act of measuring network usage activity for each of the identified plurality of the users that are logged into the network.

4. The method as recited in claim 1, further comprising an act of allocating some guaranteed minimum bandwidth for system processes that are not specific to a particular one of the plurality of users.

5. The method as recited in claim 1, wherein the act of calculating a guaranteed minimum bandwidth comprises:
    an act of assigning a plurality of bandwidth weights to each of the identified plurality of users; and
    an act of determining the guaranteed minimum bandwidth for each of the identified plurality of users based on the plurality of bandwidth weights.

6. The method as recited in claim 1, wherein the network has a limited overall bandwidth, the method further comprising an act of allowing one or more of the identified plurality of users to obtain unallocated bandwidth when the limited overall bandwidth of the network is not fully allocated.

7. The method as recited in claim 1, wherein the act of identifying the plurality of users that are logged into the network comprises:
    an act of receiving and processing a login request from a user that is newly accessing the network.

8. The method as recited in claim 1, wherein the act of identifying the plurality of users that are logged into the network comprises:
    an act of receiving and processing a logout request from a user that was previously the network.

9. The method as recited claim 1, wherein the network is the Internet.

10. The method as recited claim 1, wherein the network is a Local Area Network (LAN).

11. A computer program product comprising one or more hardware computer-storage devices having thereon stored computer-executable instructions that are executable by one or more processors of a computing system for causing the computing system to perform the following:
    identify a plurality of users that are accessing a network;
    track the identified plurality of users that are accessing the network in the database;
    update the database each time a new user accesses the network and each time a user ceases to access the network;
    calculate a guaranteed minimum bandwidth for each user that is currently accessing the network, as identified in the database, wherein the calculating is performed when the database is updated by a new user accessing the network or when an existing user ceases to access the network; and
    enforce network access policies for each user identified in the database, such that each of the users identified in the database has no less than the guaranteed minimum bandwidth.

12. The computer program product as recited in claim 11, wherein the corresponding guaranteed minimum bandwidth for at least some of the plurality of users depends on the number of the plurality of users over the period of time.

13. The computer program product as recited in claim 11, wherein the computer-executable instruction are further structured such that, when executed by the one or more processors, the computing system is further caused to perform the following:
    allocate some guaranteed minimum bandwidth for system processes that are not specific to a particular one of the plurality of users.

14. The computer program product as recited in claim 11, wherein the act of identifying a guaranteed minimum bandwidth comprises:
   an act of assigning a plurality of bandwidth weights to each of the plurality of users; and
   an act of determining the guaranteed minimum bandwidth for each user based on the plurality of bandwidth weights.

15. The computer program product as recited in claim 11, wherein the computer-executable instruction are further structured such that, when executed by the one or more processors, the computing system is further caused to perform the following:
   recalculate a policy when the new user newly access the network over the period of time, or each time that one or more of the plurality of users ceases accessing the network over the period of time; and
   enforce the recalculated policy.

16. The computer program product as recited claim 11, wherein the network is the Internet.

17. The computer program product of claim 11, wherein the guaranteed minimum bandwidth is calculated for each user by the computing system performing:
   an act of identifying a guaranteed minimum bandwidth for a first set of the plurality of users, wherein the corresponding guaranteed minimum bandwidth for the first set of the plurality of users depends on a number of the plurality of users that are accessing the network;
   an act of identifying a guaranteed minimum bandwidth for a second set of the plurality of users, wherein the corresponding guaranteed minimum bandwidth for the second set of the plurality of users is non-dependent on the number of the plurality of user accessing the network; and
   such that a change in the plurality of users accessing the network will affect the minimum bandwidth for the first set of the plurality of users without affecting the minimum bandwidth for the second set of the plurality of users.

18. A computer-implemented method for managing bandwidth utilization in a multi-user network system, the method being implemented by a computing system that includes at least one hardware processor and system memory storing computer-executable instructions which, when executed by the at least one hardware processor, implement the method, the method comprising:
   an act of the computing system identifying the plurality of users that are accessing the network by tracking which users are newly accessing the network, which users have ceased accessing the network, and which users continue to access the network over a period of time, wherein the identified plurality of users changes over the period of time;
   an act of the computing system identifying a guaranteed minimum bandwidth for a first set of the plurality of users, wherein the corresponding guaranteed minimum bandwidth for the first set of the plurality of users depends on the number of the plurality of users over the period of time;
   an act of the computing system identifying a guaranteed minimum bandwidth for a second set of the plurality of users, wherein the corresponding guaranteed minimum bandwidth for the second set of the plurality of users is non-dependent on the number of the plurality of user over the period of time;
   an act of the computing system allowing the plurality of users access to the network such that each of the plurality of users has no less than the corresponding guaranteed minimum bandwidth at least during the period of time, wherein the act of allowing the plurality of users access to the network comprises: an act of recalculating a policy for each of at least some of the plurality of users each time that a user newly access the network over the period of time, or each time that a user ceases accessing the network over the period of time; and an act of enforcing the recalculated policy, such that a change in the plurality of users accessing the network will affect the minimum bandwidth for the first set of the plurality of users without affecting the minimum bandwidth for the second set of the plurality of users; and
   an act of the computing system allocating some guaranteed minimum bandwidth for system processes that are not specific to a particular one of the plurality of users.

19. A computing system comprising:
   one or more processors;
   a multi-user bandwidth management component which is configured to track a plurality of users accessing a network over a period of time, wherein the plurality of users accessing the network changes over the period of time, the multi-user bandwidth management component being further configured to identify which users are newly accessing the network, which users have ceased accessing the network, and which users continue to access the network over the period of time;
   a multi-user bandwidth management driver configured for calculating a guaranteed minimum bandwidth for each of the plurality of users, responsive to a change in the identified plurality of users that are logged into the network;
   a bandwidth metering and flow management component configured to enforce the guaranteed minimum bandwidth for each of the identified plurality of users such that each of the identified plurality of users has no less than the corresponding guaranteed minimum bandwidth at least during the period of time; and
   a computer program product comprising one or more hardware computer-storage devices having thereon stored computer-executable instructions that are executable by one or more processors of a computing system for causing the computing system to utilize the multi-user bandwidth management component, the multi-user bandwidth management driver, and the bandwidth metering and flow management component for managing network bandwidth allocated to the plurality of users.

20. The computing system of claim 19, wherein the computing system further includes a user database that is used to track the plurality of users that are accessing the network.

21. The computing system of claim 19, wherein the computing system measures network usage activity for each of the identified plurality of the users that are logged into the network.

22. The computing system of claim 19, wherein the computing system allocates a guaranteed minimum bandwidth for system processes that are not specific to any particular user of the plurality of users.

23. The computing system of claim 19, wherein the multi-user bandwidth management driver is further configured to assign corresponding bandwidth weights to each of the identified plurality of users and to determine the guaranteed minimum bandwidth for each of the identified plurality of users based on the corresponding bandwidth weights.

* * * * *